Jan. 6, 1970 A. FRANCK 3,488,481
PARALLEL BINARY ADDER-SUBTRACTOR WITHOUT CARRY STORAGE
Filed April 20, 1966 10 Sheets-Sheet 1

INVENTOR.
ABRAHAM FRANCK
BY
Braddock + Burd
ATTORNEYS

INVENTOR.
ABRAHAM FRANCK
BY
Braddock & Burd
ATTORNEYS

Jan. 6, 1970 A. FRANCK 3,488,481

PARALLEL BINARY ADDER-SUBTRACTOR WITHOUT CARRY STORAGE

Filed April 20, 1966 10 Sheets-Sheet 3

INVENTOR.
ABRAHAM FRANCK
BY
Braddock + Burd
ATTORNEYS

INVENTOR.
ABRAHAM FRANCK
BY
Braddock + Burd
ATTORNEYS

INVENTOR.
ABRAHAM FRANCK
BY
Braddock & Burd
ATTORNEYS

INVENTOR.
ABRAHAM FRANCK
BY
Braddock + Burd
ATTORNEYS

INVENTOR.
ABRAHAM FRANCK
BY
Braddock & Burd
ATTORNEYS

INVENTOR.
ABRAHAM FRANCK
BY
Braddock & Burd
ATTORNEYS

INVENTOR.
ABRAHAM FRANCK
BY
Braddock & Burd
ATTORNEYS

INVENTOR.
ABRAHAM FRANCK
BY
Braddock & Burd
ATTORNEYS

United States Patent Office 3,488,481
Patented Jan. 6, 1970

3,488,481
PARALLEL BINARY ADDER-SUBTRACTOR WITHOUT CARRY STORAGE

Abraham Franck, Minneapolis, Minn., assignor to Fabri-Tek Incorporated, Edina, Minn., a corporation of Wisconsin Filed Apr. 20, 1966, Ser. No. 543,895
Int. Cl. G06f 7/385, 7/50
U.S. Cl. 235—175 12 Claims

ABSTRACT OF THE DISCLOSURE

Binary arithmetic apparatus for the addition and subtraction of binary numbers and having only an augend and addend register. The registers are interconnected by a superstructure of logic circuitry and a source of control pulses is provided. During a first control pulse a first portion of the logic circuitry is enabled to transfer information from each bit of a first of the registers to a bit of equal significance in the second register. During a second control pulse, a second portion of the logic circuitry is enabled to transfer any carries that are developed by the original transfer of information. There is no extra storage register for carries, as is common in prior art parallel addition equipment.

This invention is concerned with computing apparatus, and more particularly with apparatus for the parallel addition and subtraction of binary numbers.

In prior art devices of the general type herein disclosed, the digits of two binary numbers are generally added together in a two-step process through a parallel operation. During the first time phase, a digit by digit addition is performed without any carries. During the second step, carries are propagated to complete the process of determining the sum of the two numbers. During the first phase, appropriate logic circuitry is used to permit the digit by digit addition without carries, and an interim storage register is used to store the sum without carries. During the second step superstructure of logic for providing carries is connected between the interim register and the storage register holding the addend, to provide a complete sum to the final accumulator register. The primary purpose of the interim register and the superstructure logic is to gain speed in forming the sum of the two binary numbers. This additional hardware used to gain speed is costly both in initial expense and in the space it consumes.

The network of this invention provides a parallel arithmetic network which develops a magnitude and sign arithmetic, rather than the 1's-complement and 2's-complement systems in common use in the prior art. Only two storage registers are required, one containing the augend and the other the addend. Each register is comprised of a plurality of bistable elements. Logic is provided which connects each of the bistable elements to a corresponding bistable element of the same bit significance in the other register. Further logic is provided interconnecting the first mentioned logic to enable the propagation of carries.

In forming the sum or difference of two magnitude and sign numbers, an appropriate algorithm is provided. The algorithm is broken into three phases: an initial correction phase concerned with forming the 1's-complement of the magnitude bits of the addend when the numbers to be added are of opposite sign, the addition of the magnitude bits of the augend and the addend (corrected if necessary), and a final correction phase to form the proper sum. Hereinafter this specification will be concerned only with the second phase, that is, only with the addition of the magnitude bits of the two numbers, and not with the initial and final corrections.

As will be more fully described below the addition of the two binary numbers will take place in three time steps. During the first step, each of the corresponding bits in the two registers are added without regard to intergroup carries. During the second step, any such carries which were generated are propagated to obtain the final adder sum. A third step is provided to analyze the accumulator or augend register to determine if its condition is such as to aid in determination of the final nature of the resulting sum. By performing the addition in this manner, with the use of only two storage registers and interconnecting logic, it will be apparent that a sophisticated algorithm can be used with a large savings in hardware, at the cost of some speed.

Figure 1:
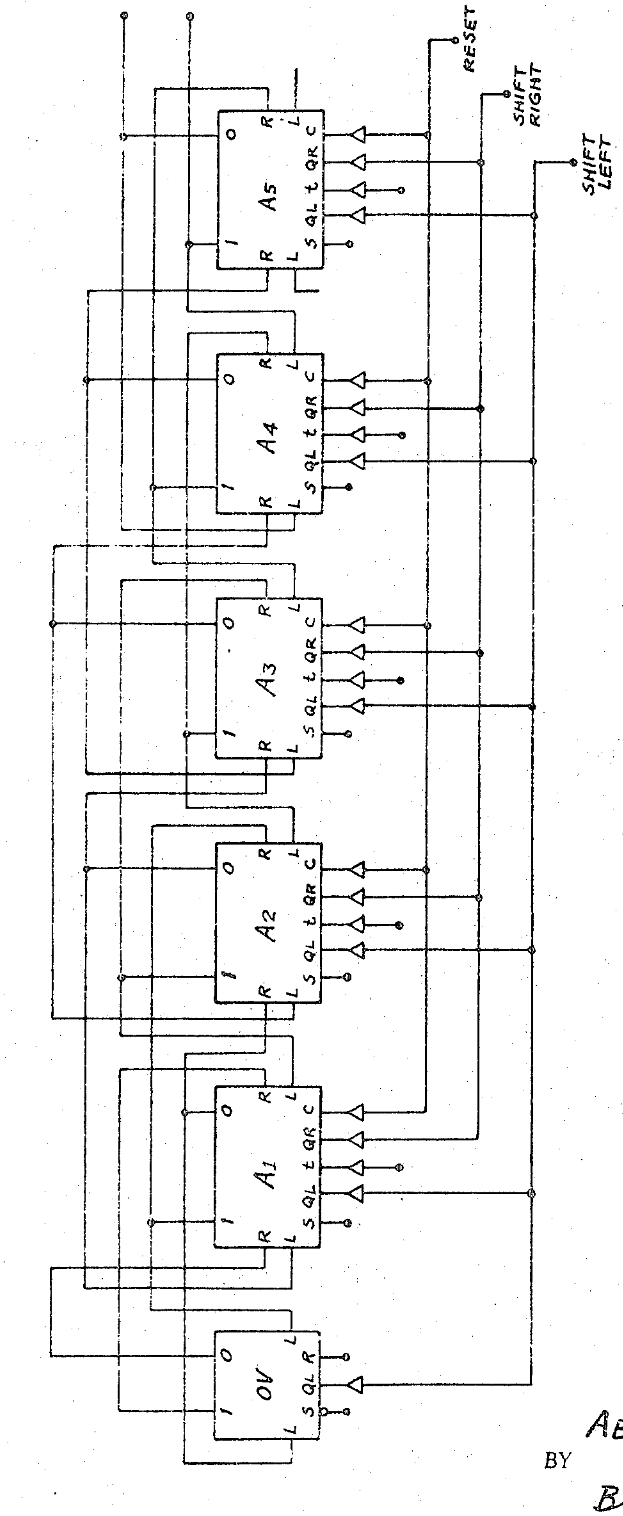
FIG. 1 is a schematic drawing showing a portion of the interconnection of an accumulator register used in the network of this invention.

In FIG. 1 there is shown a binary storage register. The register is here shown comprised of five bistable storage elements $A_1$, $A_2$, $A_3$, $A_4$ and $A_5$. Each of the bistable elements $A_1$–$A_5$ is capable of assuming either one of two stable states to represent a binary digit. In the register of FIG. 1, and for the purposes of the following explanation of the operation of this invention, element $A_5$ represents the least significant bit of a binary number, while element $A_1$ represents the most significant bit of the binary number.

Also shown in FIG. 1 is an overflow flip-flop OV, the function of which will be more fully described below. In FIG. 1 connections are shown between the various bistable elements of the register which connect the elements into a shift register capable of shifting left or right, if desired such as for multiply and divide operations. The OV bistable element is also used in the shift register.

Each of bistable elements $A_1$–$A_5$ has a "0" and a "1" output terminal, as well as a pair of right shift terminals "R" and a pair of left shift input terminals "L." The "0" and "1" output terminals of each of the bistable elements in the shift register are connected to a left shift terminal on the bistable element immediately to its left and to a right shift terminal on a bistable element immediately to its right. In addition each of the bistable elements $A_1$–$A_5$ has a shift left input terminal "$Q_L$," and a shift right input terminal "$Q_R$." The "$Q_L$" terminals are simultaneously energized from a shift left input terminal. The "$Q_R$" terminals are simultaneously energized from a shift right input terminal. The connections described above for connecting the bistable elements into a shift register capable of shifting left or right are well known to those skilled in the art, as are many similar connections for shift registers. Because these connections are well known and do not form a part of this invention, detailed description and discussion of these connections and their operations will not be made in this specification. Suffice it to say that binary information can be shifted left or right into the register comprised of bistable elements $A_1$–$A_5$ and bistable element OV, this register hereinafter to be called the accumulator register.

Bistable elements $A_1$–$A_5$ in the accumulator register also each have a set input terminal "S," and a clear input terminal "C." The "C" input terminals are simultaneously enabled and are all connected to a reset input terminal. In addition, all the bistable elements of the accumulator register have a toggle input "$t$," which is connected through a network of logic circuits to receive signals from an exchange register (not shown). For purposes of this invention it will hereinafter be assumed that the accumulator register bistable elements $A_1$–$A_5$ contain the augend, to which it is desired to add the addend, which is contained in the exchange register bistable elements $X_1$, $X_2$, $X_3$, $X_4$ and $X_5$ (not shown).

To best understand the logic diagrams of FIGS. 2 through 9, there should first be an understanding of the algorithm used to perform the addition of the binary numbers stored in the accumulator and exchange registers.

The binary numbers to be added will be stored in the accumulator and exchange registers. The numbers in the embodiment of the drawings are each expressed in six bits; the leftmost bit for sign indication (0=+, 1=−), and the other five bits for magnitude. The augend is stored in the accumulator register, and the addend is stored in the exchange register. Hereinafter, the legend AM will designate the elements representing the magnitude of the accumulator register, and the legend XM will designate the elements representing the magnitude of the exchange register. The storage elements for the sign bit is not shown in the drawings, the use of a flip-flop, for example, is well known.

The algorithm is a sophisticated mathematical analysis which can be mechanized with logic circuits to carry out the addition of the binary numbers stored in the accumulator and exchange registers in three phases. The first phase is a correction phase concerned with forming the 1's-complement of the bits which make up the binary number of the addend, if the two binary numbers to be added are of opposite sign. The third phase is a final correction phase to form a proper sum between the two numbers. It is only the second phase of the algorithm with which this invention is concerned, that is, the addition of the bits of the augend and the addend stored, respectively, in the accumulator and exchange registers.

For best understanding of the addition process, consider the registers AM and XM as separated into three groups:

$$\begin{array}{ll|ll|ll} \text{AM:} & A_1 & A_2 & A_3 & A_4 & A_5 \\ \text{XM:} & X_1 & X_2 & X_3 & X_4 & X_5 \end{array}$$

The addition is performed in three sequential time periods, hereinafter referred to as periods $T_1$, $T_2$ and $T_3$. Development of the sequential control pulses, or time periods $T_1$, $T_2$ and $T_3$ will be more fully described in the discussion below of FIG. 11. During period $T_1$ each of the corresponding bits in the two registers are added without regard to inter-group carriers, though the usual inner-group carries are performed. For purposes of this specification, inter-group carries are carries between the three groups comprising $A_4$ and $A_5$, $A_2$ and $A_3$, and $A_1$, while inner-group carries are carries between group elements, such as $A_5$ to $A_4$, and $A_3$ to $A_2$.

Following period $T_1$ the new state of the accumulator register would appear as follows, with the primes (′) indicating the new states:

$$\begin{array}{ll|ll|ll} \text{AM:} & A_1' & A_2' & A_3' & A_4' & A_5' \\ \text{XM:} & X_1 & X_2 & X_3 & X_4 & X_5 \end{array}$$

with the exchange register remaining the same as it was before.

The inter-group carries which may have been generated from the two rightmost groups are ignored during period $T_1$, but the carry which may have been generated from the addition of $A_1$ and $X_1$ is recorded for later use in determining the final sum of the two binary numbers. In this embodiment an overflow bistable element is set to record this latter carry during period $T_1$.

During the period $T_2$, the inter-group carries which were generated from the first two groups are propagated so that the proper final sum can be obtained. From the rightmost two-bit group, a group carry enable $G_4$ can be generated. From the middle two-bit group the carry generated can arise from two situations. During period $T_1$, a group carry enable $G_2$ may have been generated. If so, the group carry enable $G_4$ which enters the middle group during period $T_2$ will produce no further carry from this group. If there is no group carry enable $G_2$ generated during period $T_1$, then a carry may be generated from the middle group if a propagate enable is present, that is if the sum resulting from period $T_1$ is such that $A_2'$ and $A_3'$ both equal 1, and if there was a group carry enable $G_4$ during period $T_1$.

If a carry emerges from the middle group, either as a result of a group carry enable $G_2$ or a propagated carry, then it will change the state of $A_1'$. It is also possible during period $T_2$ to obtain a propagated carry from the leftmost group. If this occurs, this fact is recorded by setting the overflow bistable element.

During $T_3$, the accumulator register is analyzed to determine if all the bistable elements are in the "1" state. This can occur only if the original bits of the accumulator and exchange register were complements of one another. This fact is noted during period $T_3$ by setting a logic zero bistable element. This fact may be used to determine the final nature of the resultant sum, but though used in this preferred embodiment it is not a mandatory portion of this invention.

The algorithm for the addition of the two binary numbers can be expressed in a plurality of Boolean equations. The equations can then be mechanized or implemented with logic circuits to perform the addition.

The following symbols and abbreviations are defined for better understanding of Boolean equations:

S=Set
$t$=Toggle
OV=Overflow
$A_k$=One digit of the magnitude of the number in the accumulator register
$X_k$=One digit of the magnitude of the number in the exchange register SOV=Set overflow bistable element
SLZ=Set logic zero bistable element
$G_n$=Group carry signal as defined below
$T_n$=Time period at time $n$ The following Boolean equations are used to perform the addition of the binary numbers stored in the accumulator and exchange registers:

(1) $tA_5=X_5 \cdot T_1$ (2) $tA_4=[X_4 \cdot (\overline{A}_5+\overline{X}_5)+\overline{X}_4 \cdot A_5 \cdot X_5] \cdot T_1$ (3) $tA_3=X_3 \cdot T_1+G_4 \cdot T_2$ (4) $tA_2=[X_2 \cdot (\overline{A}_3+\overline{X}_3)+\overline{X}_2 \cdot A_3 \cdot X_3] \cdot T_1+G_4 \cdot A_3 \cdot T_2$ (5) $tA_1=X_1 \cdot T_1+(A_2 \cdot A_3 \cdot G_4+G_2) \cdot T_2$ (6) $SOV=X_1 \cdot A_1 \cdot T_1+A_1 \cdot (A_2 \cdot A_3 \cdot G_4+G_2) \cdot T_2$ (7) $SLZ=A_1 \cdot A_2 \cdot A_3 \cdot A_4 \cdot A_5 \cdot T_3$ (8) $G_4=X_5 \cdot \overline{A}_5 \cdot (X_4+\overline{A}_4)+X_4 \cdot \overline{A}_4$
(evaluated at period $T_2$)

(9) $G_2=X_3 \cdot \overline{A}_3 \cdot (X_2+\overline{A}_2)+X_2 \cdot \overline{A}_2$
(evaluated at period $T_2$)

Figure 2:
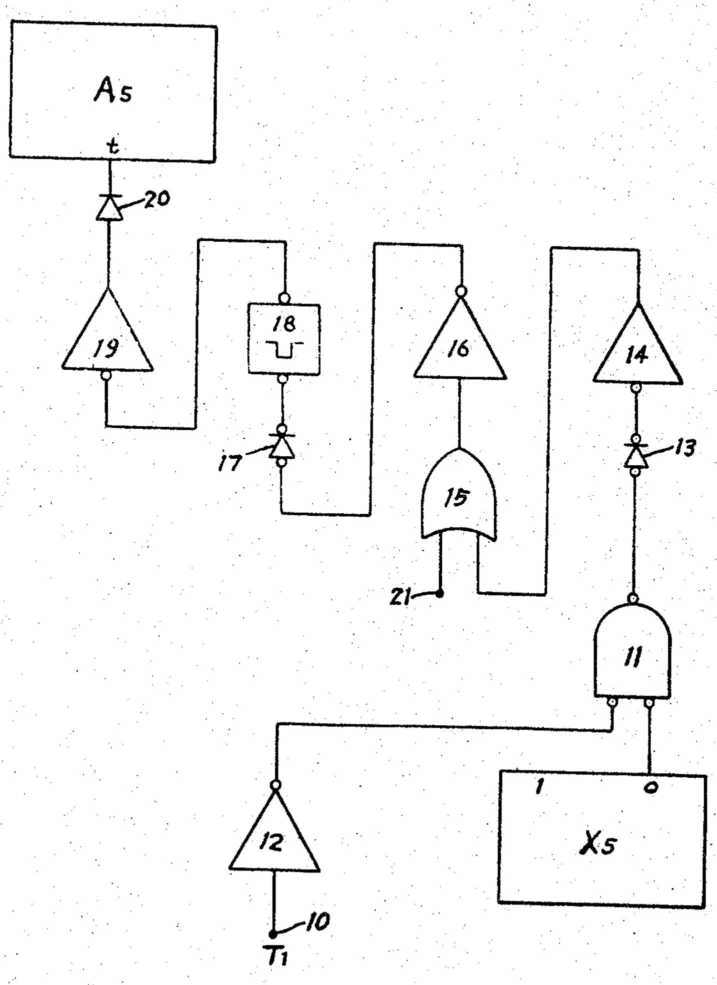
FIG. 2 is a logic diagram showing the interconnection of two bistable elements representing the least significant bit in each of two storage registers.

Referring now to FIG. 2, it will be apparent that this logic schematic represents a hardware implementation of Boolean Equation No. 1. To toggle bistable element $A_5$ it is necessary to have the presence of both $X_5$ and $T_1$. In FIG. 1, bistable element $X_5$ has its "0" output terminal connected to an input terminal on a negative AND gate 11. An input terminal 10, adapted to receive control pulse $T_1$ is connected to the input terminal of an inverter 12, the output of which is connected to another input on negative AND gate 11. The output of gate 11 therefore has the required $X_5$ and $T_1$ signal necessary to toggle element $A_5$. This required signal then passes through an isolation diode 13, an inverter 14, an OR gate 15, an inverter 16, an isolation diode 17, a delay network or one-shot multivibrator 18, an inverter 19, and a diode 20 to the "*t*" or toggle input of $A_5$.

Delay circuit 18 is necessary to prevent errors due to noise or change of state following the initial presence of control signal $T_1$. That is, it will be apparent from the ensuing discussion of the figures that the state of each of elements $A_1$–$A_5$ is used in the logic for the setting or resetting of one or more of another of elements $A_1$–$A_5$ during the time of control signal $T_1$. Delay circuit 18 is used to prevent $A_5$ from changing state when added to element $X_1$ before the other elements $A_1$–$A_4$ have been properly added with elements $X_1$–$X_4$. A delay circuit similar to 18 is associated with each of elements $A_1$–$A_5$. An input 21 is provided on OR gate 15 to allow toggling of element $A_5$ from other sources.

Figure 3:
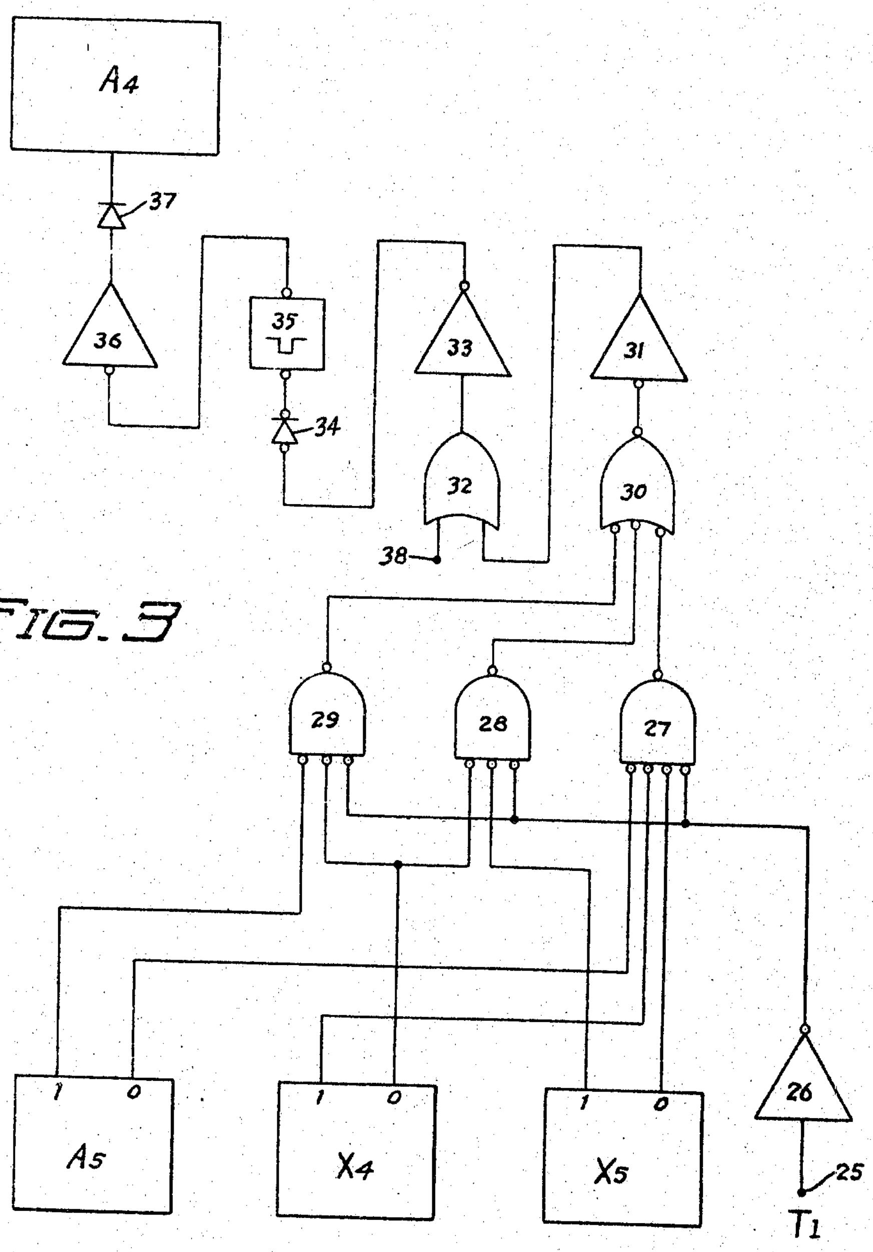
FIG. 3 is a logic diagram showing the interconnection of two bistable elements representing the bit significance of next highest order in each of two storage registers, and including logic for propagating a carry.

Referring now to FIG. 3 it will be apparent that this logic schematic is an implementation of Boolean Equation No. 2. This circuit is designed to toggle bistable element $A_4$ in the presence of control pulse $T_1$ and $X_4$ and either $\overline{A}_5$ or $\overline{X}_5$; or in the presence of $T_1$ and $A_5$ and $X_5$ and $\overline{X}_4$. In the drawing there is shown a negative AND gate 27, having four input terminals. A first input terminal on gate 27 is connected to an output terminal of an inverter 26, which has an input terminal connected to a terminal 25 adapted to receive control signal $T_1$. A second input terminal on gate 27 is connected to the "0" output terminal of bistable element $X_5$. A third input terminal on gate 27 is connected to a "1" output terminal of bistable element $X_4$. A fourth input terminal on gate 27 is connected to a "0" output terminal on bistable element $A_5$. Thus when gate 27 is actuated by the proper signals its only output can be a signal representing the presence of $T_1$ and $X_5$ and $A_5$ and $\overline{X}_4$, one of the signals required to toggle bistable element $A_4$. If this signal is present it will pass through a negative OR gate 30, an inverter 31, an OR gate 32, an inverter 33, an isolation diode 34, a one-shot multivibrator 35, an inverter 36, and a diode 37 to the "*t*" input terminal of bistable element $A_4$.

Also in FIG. 3 there is shown a negative AND gate 28 having three input terminals and an output terminal. A first input terminal on gate 28 is connected to the output of inverter 26. A second input terminal on gate 28 is connected to the "1" output terminal of bistable element $X_5$. A third input terminal on gate 28 is connected to the "0" output terminal of bistable element $X_4$. Thus whenever negative AND gate 28 is actuated the only output signal which can appear is that involving the presence of $T_1$ and $X_4$ and $\overline{X}_5$, which is one of the signals required to toggle bistable element $A_4$. This signal will also pass through the string of gates 30 through 36, and diode 37 to the "*t*" input terminal of bistable element $A_4$.

Also shown in FIG. 3 is a negative AND gate 29 having three input terminals and an output terminal. A first input terminal on gate 29 is connected to the output of inverter 26. A second input terminal on gate 29 is connected to the "0" output terminal of bistable element $X_4$. The third output terminal of gate 29 is connected to the "1" output terminal of the bistable element $A_5$. Thus the only signal which can appear at the output of negative AND gate 29 is that comprised of $T_1$ and $X_4$ and $\overline{A}_5$, which is yet another of the signals which must be present to toggle bistable element $A_4$. This signal will also pass through the chain of gates 30–36, and diode 37 to toggle bistable element $A_4$.

Figure 4:
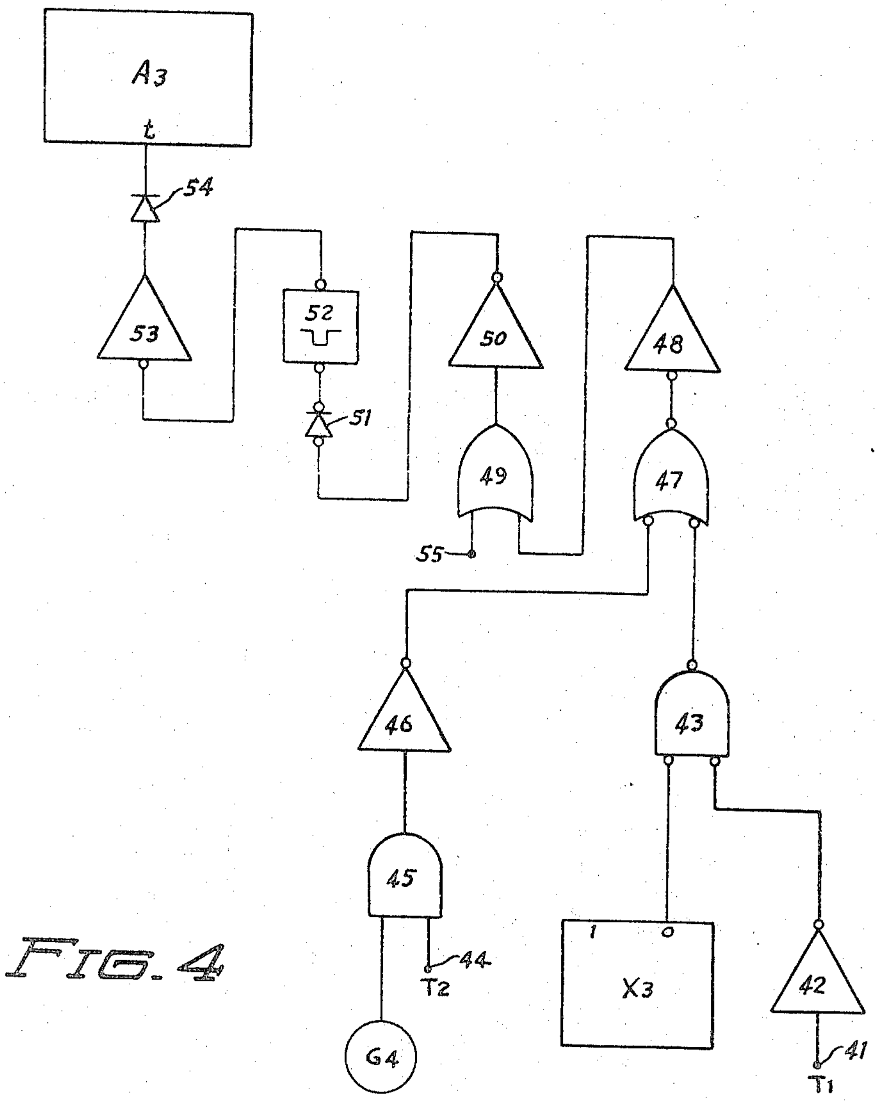
FIG. 4 is a logic diagram showing the interconnection of two bistable elements representing the bits of next highest order of significance in each of two storage registers, including logic for propagating a carry.

Referring to FIG. 4 it will be apparent that this logic schematic is an implementation of Boolean Equation No. 3. This circuit is designed to toggle bistable element $A_3$ in the presence of control signal $T_1$ and $X_3$, or in the presence of control signal $T_1$ and $G_4$.

In FIG. 4 there is shown a negative AND gate 43 having two input terminals and an output terminal. A first input terminal on gate 43 is connected to an output terminal of an inverter 42, which has an input terminal connected to another input terminal 41 adapted to receive control signal $T_1$. A second input terminal on gate 43 is connected to the "0" output terminal of bistable element $X_3$. Thus the only signal which can appear at the output of negative AND gate 43 is comprised of $T_1$ and $X_3$, recognized as one of the signals necessary to toggle bistable element $A_3$. This signal will pass through a negative OR gate 47, an inverter 48, an OR gate 49, an inverter 50, an isolation diode 51, a one-shot multivibrator 52, an inverter 53, and a diode 54 to the "*t*" input terminal of bistable element $A_3$.

Also shown in FIG. 4 is an AND gate 45 having a pair of input terminals and an output terminal. A first input terminal on gate 45 is connected to an input terminal 44 adapted to receive control signal $T_2$. A second input terminal on gate 45 is connected to a block representing $G_4$, a group signal carry enable which will be further defined in the discussion below of FIG. 7. Thus the only signal which can appear at the output terminal of AND gate 45 must be comprised of $T_2$ and $G_4$, which will be recognized as another of the signals which can toggle bistable element $A_3$. This signal will pass through an inverter 46, and then through the chain of gates 47–53, and diode 54 to the "*t*" input terminal of bistable element $A_3$.

Figure 5:
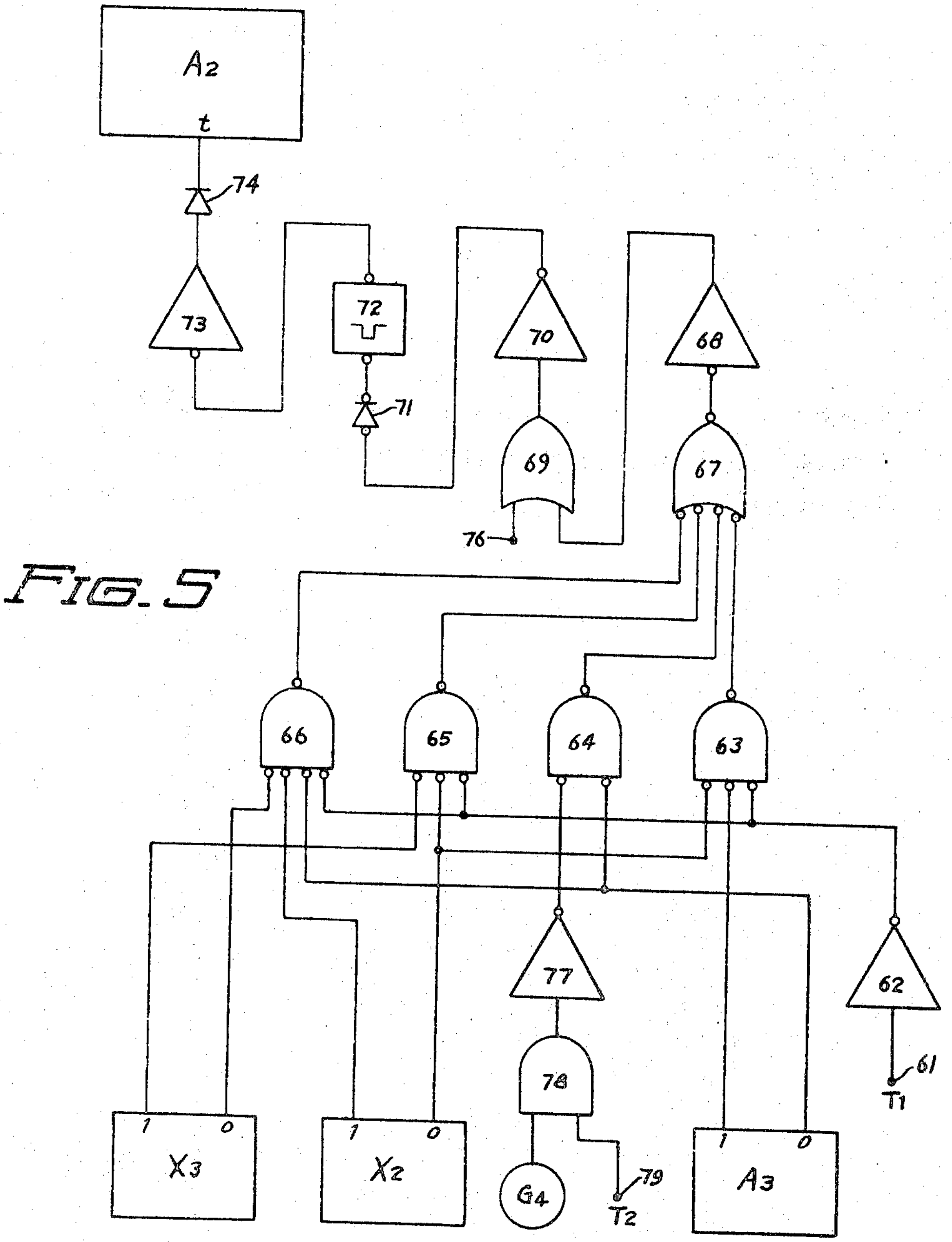
FIG. 5 is a logic diagram showing the interconnection of two bistable elements representing the bits of next highest order of significance in each of two storage registers, including logic for propagating a carry.

Referring now to FIG. 5 it will be apparent that this logic schematic is an implementation of Boolean equation No. 4. This logic network is designed to toggle $A_2$ in the presence of a signal comprised of $T_1$ and $X_2$ and either $\overline{A}_3$ or $\overline{X}_3$; or $T_1$ and $A_3$ and $X_3$ and $\overline{X}_2$; or $T_2$ and $G_4$ and $A_3$.

In FIG. 5 there is shown a negative AND gate 63 having three input terminals and an output terminal. A first input terminal on gate 63 is connected to the output of an inverter 62, which has an input connected to a terminal 61 adapted to receive control signal $T_1$. A second input terminal on gate 63 is connected to the "1" output terminal of bistable element $A_3$. A third input terminal on AND gate 63 is connected to the "0" output terminal of bistable element $X_2$. Therefore the only signal which can appear on the output terminal of negative AND gate 63 is comprised of $T_1$ and $X_2$ and $\overline{A}_3$, which will be recognized as one of the signals required to toggle bistable element $A_2$. This signal will then pass through a negative OR gate 67, an inverter 68, an OR gate 69, an inverter 70, an isolation diode 71, a one-shot multivibrator 72, an inverter 73, and a diode 74 to the "*t*" input terminal of bistable element $A_2$.

There is also shown a negative AND gate 64 having two input terminals and an output terminal. A first input terminal on AND gate 64 is connected to a "0" output terminal on bistable element $A_3$. A second input terminal on gate 64 is connected through an inverter 77 to the output of an AND gate 78. A first input terminal on AND gate 78 is connected to a terminal 79 adapted to receive control signal $T_2$. A second input terminal on AND gate 78 is connected to an output terminal on a block representing group carry enable signal $G_4$. Thus the only signal which can appear at the output terminal of gate 78 is that comprised of $T_2$ and $G_4$, and the only signal which can appear at the output of negative AND gate 64 is that comprised of $T_2$ and $G_4$ and $A_3$, which is recognized as one of the signals required to toggle bistable element $A_2$. This latter signal will travel through gates 67–73, and diode 74 to the "*t*" input terminal of bistable element $A_2$.

Also shown is a negative AND gate 65 having three input terminals and an output terminal. A first input terminal is connected to the output of inverter 62. A second input terminal is connected to the "0" output terminal of bistable element $X_2$. A third input terminal on gate 65 is connected to the "*l*" output terminal of bistable element $X_3$. Thus the only signal that can appear at the output terminal of negative AND gate 65 is that comprised of $T_1$ and $X_2$ and $\overline{X}_3$, which will be recognized as one of the signals required to toggle bistable element $A_2$. This signal will also pass through gates 67–73, and diode 74 to the "*t*" input terminal of bistable element $A_2$.

Also shown is a negative AND gate 66 having four input terminals and an output terminal. A first input terminal on gate 66 is connected to the output of inverter 62. A second input terminal on gate 66 is connected to the "0" output terminal of bistable element $A_3$. A third input terminal on gate 66 is connected to the "1" output terminal of bistable element $X_2$. A fourth input terminal on gate 66 is connected to the "0" output terminal of bistable element $X_3$. Therefore the only signal which can appear at the output terminal of negative AND gate 66 is that comprised of $T_1$ and $A_3$ and $X_3$ and $\overline{X}_2$, which is recognized as the last of the signals which can toggle bistable element $A_2$. This signal will also pass through gates 67–73, and diode 74 to the "*t*" input terminal of bistable $A_2$.

Figure 6:
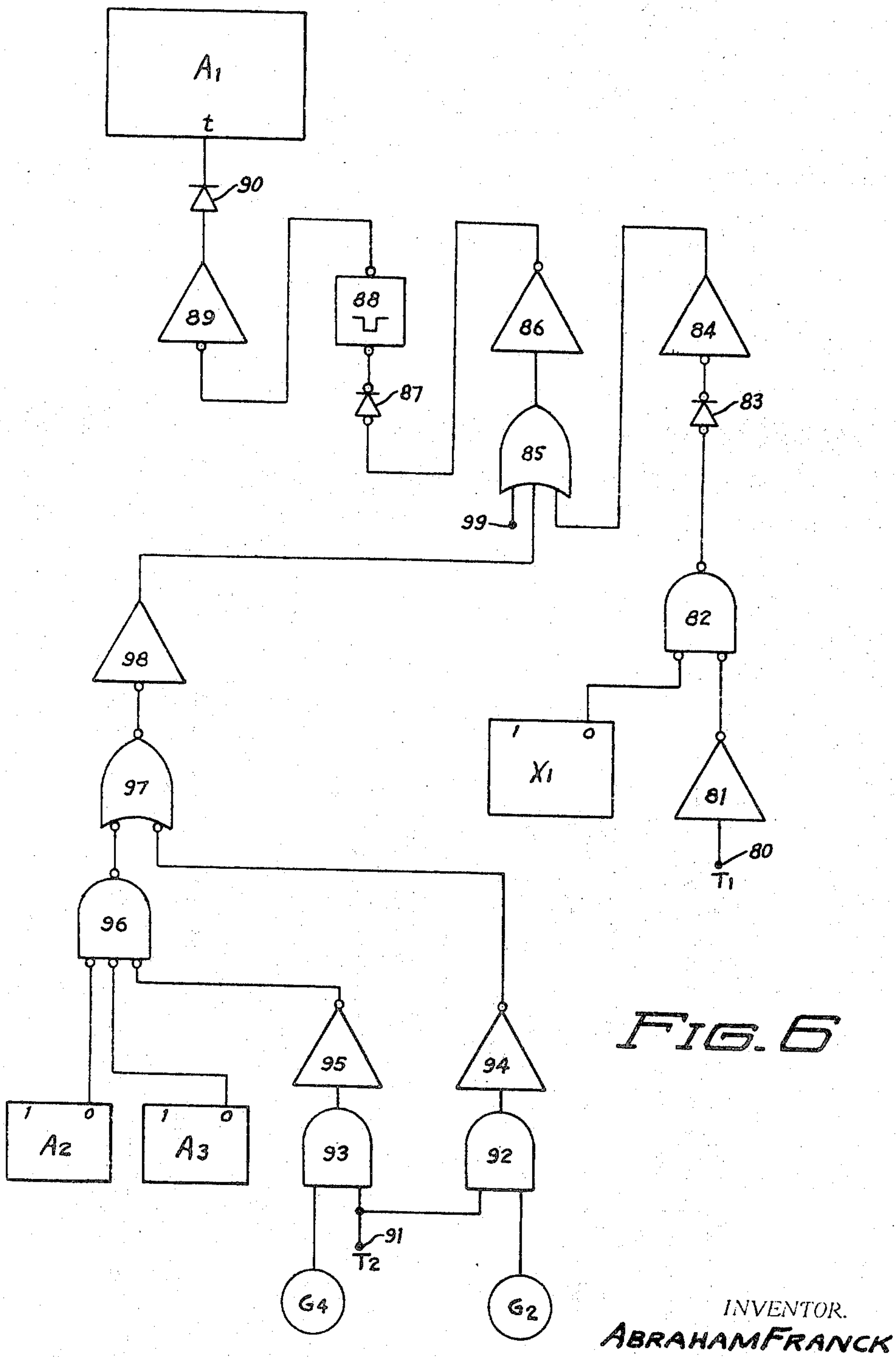
FIG. 6 is a logic diagram showing the interconnection of two bistable elements representing the bits of next highest order of significance in each of two storage registers, including logic for propagating a carry.

Referring now to FIG. 6 it will be apparent that this logic schematic implements Boolean Equation No. 5. This network provides for the toggling of bistable element $A_1$ in the presence of signals comprising $T_1$ and $X_1$; or $T_2$ and $G_2$; or $T_2$ and $A_2$ and $A_3$ and $G_4$.

In FIG. 6 there is shown a negative AND gate 82 having two input terminals and an output terminal. A first input terminal on gate 82 is connected to an output terminal on an inverter 81, the input of which is connected to a terminal 80 adapted to receive control pulse $T_1$. A second input terminal on gate 82 is connected to the "0" output terminal of bistable $X_1$. Thus the only signal which can appear at the output of gate 82 is comprised of $T_1$ and $X_1$, which will be recognized as one of the signals which can toggle bistable element $A_1$. This signal will then pass through an isolation diode 83, an inverter 84, an OR gate 85, an inverter 86, an isolation diode 87, a one-shot multivibrator 88, an inverter 89, and a diode 90 to the "*t*" input terminal of bistable element $A_1$.

There is also shown an AND gate 92 having two input terminals and an output terminal. A first input terminal on gate 92 is connected to a terminal 91 adapted to receive control signal $T_2$. A second input terminal on gate 92 is connected to an output terminal on the block representing group carry enable signal $G_2$, which will be more fully described in the discussion below of FIG. 8. Thus the only signal which can appear at the output of AND gate 92 is comprised of $T_2$ and $G_2$, which will be recognized as one of the signals which can trigger bistable element $A_1$. This signal will pass through an inverter 94, a negative OR gate 97, an inverter 98, OR gate 85, inverter 86, isolation diode 87, one-shot multivibrator 88, inverter 89, and diode 90 to the "*t*" input terminal of bistable element $A_1$.

There is also shown a negative AND gate 96 having three input terminals and an output terminal. A first input terminal on gate 96 is connected to an "0" output terminal on bistable element $A_2$. A second input terminal on gate 96 is connected to a "0" output terminal on bistable element $A_3$. A third input terminal on gate 96 is connected to an output terminal on an inverter 95. The input of inverter 95 in connected to an output terminal on an AND gate 93 having two input terminals. A first input terminal on AND gate 93 is connected to terminal 91 which is adapted to receive control pulse $T_2$. A second input terminal on gate 93 is connected to an output terminal of a block representing group carry enable signal $G_4$. Thus the only signal which can appear at the output terminal of AND gate 93 is comprised of $T_2$ and $G_4$, which will be felt through inverter 95 at the input of gate 96. Thus the only signal which can be felt at the output terminal of negative AND gate 96 is comprised of $T_2$ and $G_4$ and $A_2$ and $A_3$, which will be recognized as one of the signals which can trigger bistable element $A_1$. The signal will then pass through negative OR gate 97, inverter 98, OR gate 85, inverter 86, isolation diode 87, delay circuit 88, inverter 89, and diode 90 to the "*t*" input terminal of bistable element $A_1$.

Figure 7:
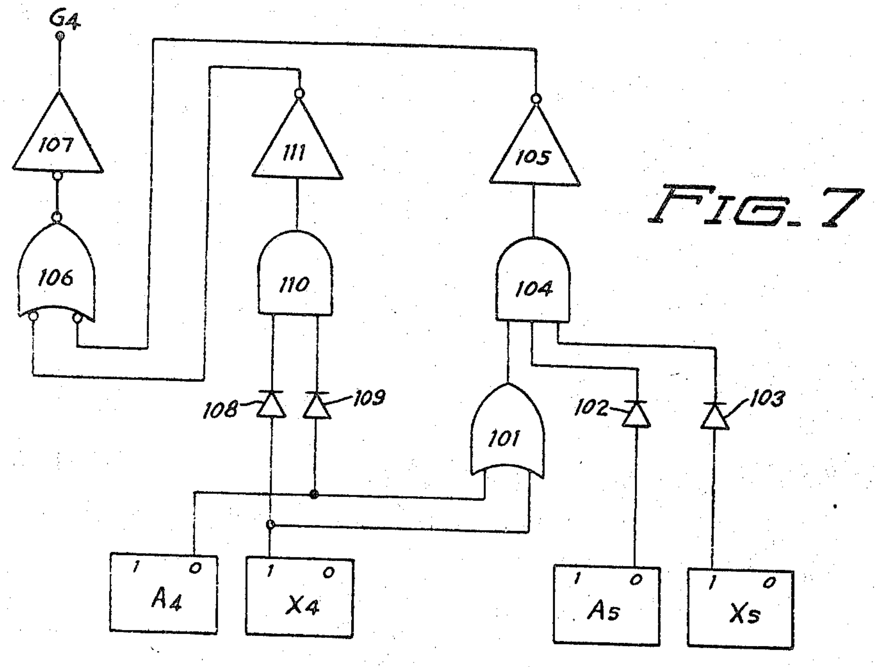
FIG. 7 is a logic diagram showing the network used to provide one signal for propagating a carry.

Referring now to FIG. 7, it will be apparent that this logic network develops group carry enable signal $G_4$ represented in Boolean Equation No. 8. There is shown in FIG. 7 an AND gate 104 having three input terminals and an output terminal. A first input terminal on gate 104 is connected through a diode 103 to the "1" output terminal of bistable element $X_5$. A second input terminal on gate 104 is connected through a diode 102 to the "0" output terminal on bistable element $A_5$. A third input terminal on gate 104 is connected to the output terminal of an OR gate 101. A first input terminal on OR gate 101 is connected to the "1" output terminal on bistable element $X_4$. A second input terminal on gate 101 is connected to the "0" input terminal of bistable element $A_4$. Thus the only signals that can appear on the output terminal of gate 104 are $X_5$ and $\overline{A}_5$ and $X_4$; or $X_5$ and $\overline{A}_5$ and $\overline{A}_4$. When either of these signals is present at the output terminal of gate 104, it will pass through an inverter 105, a negative OR gate 106 and an inverter 107 to provide group carry enable signal $G_4$.

There is also shown in FIG. 7 an AND gate 110 having two input terminals and an output terminal. A first input terminal on gate 110 is connected through a diode 108 to the "1" output terminal of bistable element $X_4$. A second input terminal on gate 110 is connected through a diode 109 to the "0" output terminal of bistable element $A_4$. Thus the only signal that can appear at the output terminal of AND gate 110 is $X_4$ and $\overline{A}_4$. When this signal is present it will pass through an inverter 111, negative OR gate 106, and inverter 107 to provide group carry enable signal $G_4$.

Figure 8:
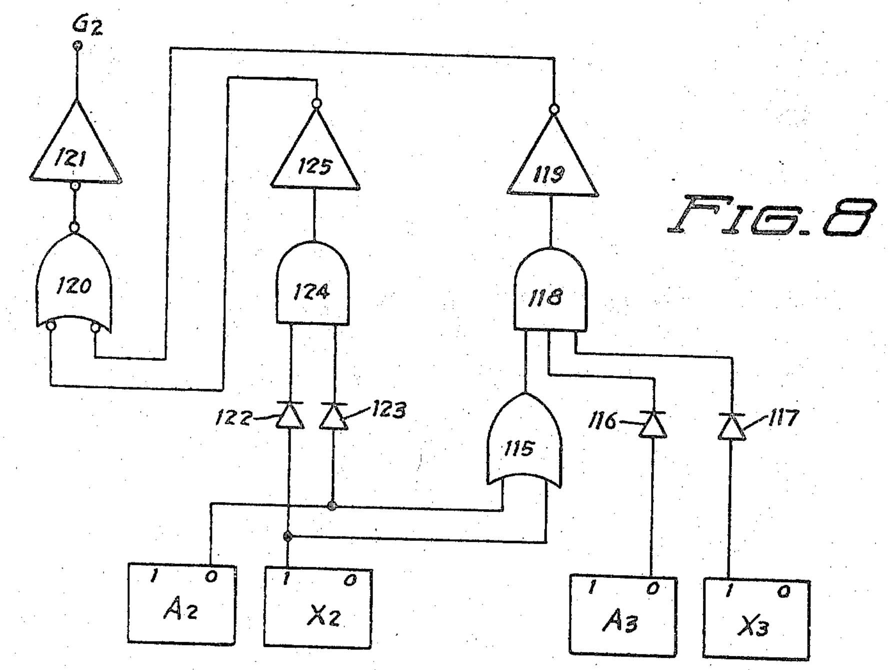
FIG. 8 is a logic diagram showing the network used to form another signal used to propagate a carry.

Referring now to FIG. 8 it will be apparent that the logic network provided is an implementation of Boolean Equation No. 9 for providing group carry enable signal $G_2$.

In FIG. 8 there is shown an AND gate 118 having three input terminals and an output terminal. A first input terminal on gate 118 is connected through a diode 117 to the "1" output terminal of bistable element $X_3$. A second input terminal on gate 118 is connected through a diode 116 to the "0" output terminal of bistable element $A_3$. A third input terminal on gate 118 is connected to an output terminal on an OR gate 115. A first input terminal on OR gate 115 is connected to a "1" output terminal of bistable element $X_2$. A second input terminal on gate 115 is connected to a "0" output terminal on bistable element $A_2$. Thus the only signals which can appear at the output terminal of AND gate 118 are $X_3$ and $\overline{A}_3$ and $X_2$; or $X_3$ and $\overline{A}_3$ and $\overline{A}_2$. When either of these signals is present it will pass through an inverter 119, a negative OR gate 120, and an inverter 121 to provide group carry enable signal $G_2$.

Also shown in FIG. 8 is an AND gate 124 having two input terminals and an output terminal. A first input terminal on gate 124 is connected through a diode 122 to the "1" output terminal of bistable element $X_2$. A second input terminal on gate 124 is connected through a diode 123 to the "0" output terminal of bistable element $A_2$. Thus the only signal which can appear on the output terminal of AND gate 124 is $X_2$ and $\overline{A}_2$. When this signal is present it will pass through an inverter 125, negative OR gate 120, and inverter 121 to provide group carry enable signal $G_2$.

Figure 9:
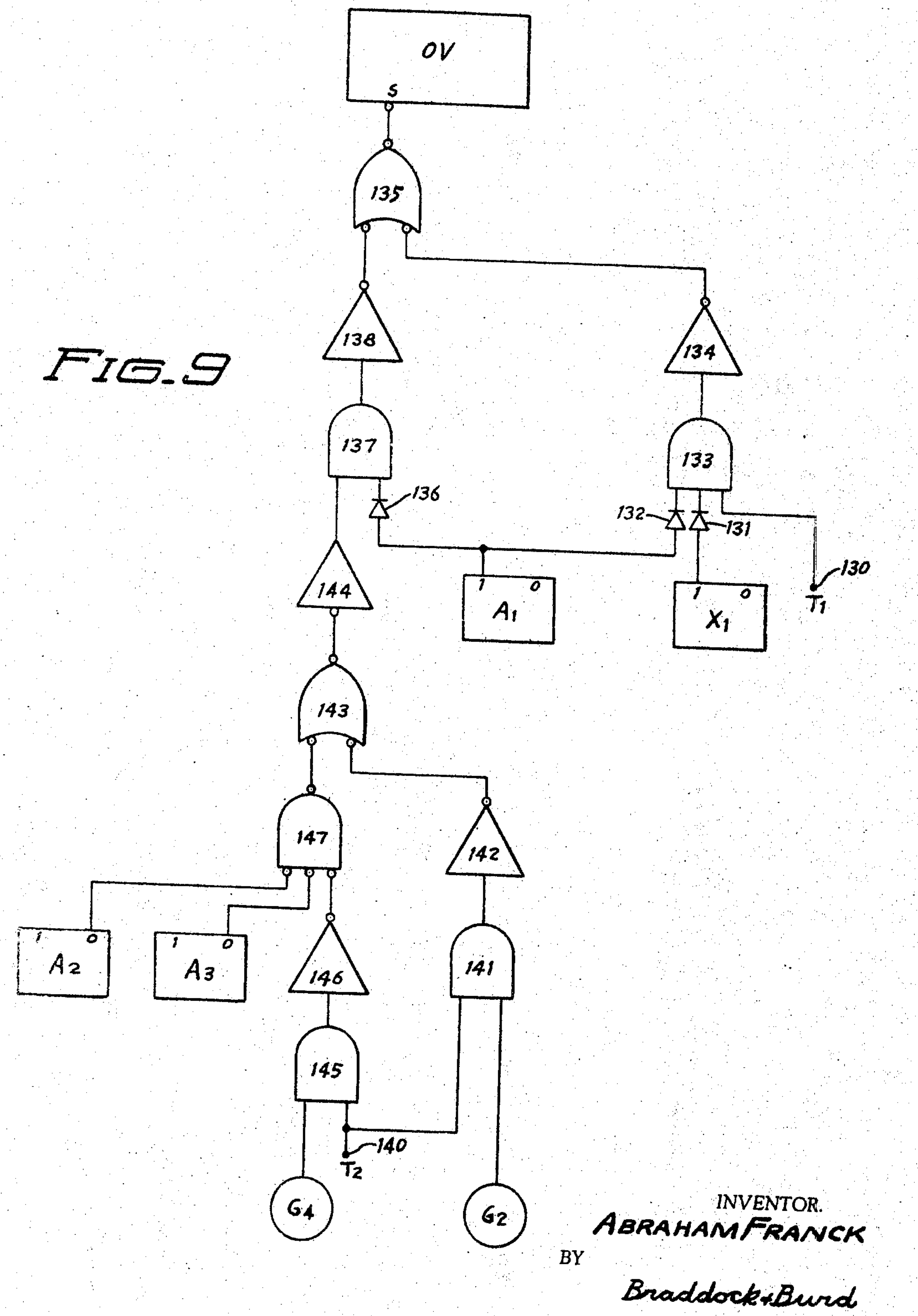
FIG. 9 is a logic diagram showing the network used to derive a signal to set an overflow bistable element used in completion of the algorithm used with the apparatus of this invention.

Referring to FIG. 9 it will be apparent that this logic schematic is an implementation of Boolean Equation No. 6. This network provides for the setting of the overflow flip-flop OV in the presence of signals comprising $X_1$ and $A_1$ and $T_1$; or $A_1$ and $T_2$ and $G_2$; or $A_1$ and $A_2$ and $A_3$ and $T_2$ and $G_4$.

In FIG. 9 there is shown an AND gate 133 having three input terminals and an output terminal. A first input terminal on gate 133 is connected to a terminal 130 adapted to receive control pulse $T_1$. A second input terminal on AND gate 133 is connected through a diode 131 to the "1" output terminal of bistable element $X_1$. A third input terminal on gate 133 is connected through a diode 132 to a "1" output terminal of bistable element $A_1$. Thus the only signal which can appear at the output of AND gate 133 is comprised of $T_1$ and $X_1$ and $A_1$, which will be recognized as one of the signals which can set the overflow flip-flop. When this signal is present it will pass through an inverter 134 and a negative OR gate 135 to the "S" or set input terminal on the OV bistable element.

In FIG. 9 there is also shown an AND gate 137 having two input terminals and an output terminal. A first input terminal on gate 137 is connected through a diode 136 to the "1" output terminal of bistable element $A_1$. A second input terminal on gate 137 is connected to the output of an inverter 144. The input of inverter 144 is connected to the output of a negative OR gate 143. A first input terminal on negative OR gate 143 is connected to the output of an inverter 142, which has its input connected to the output of an AND gate 141. A first input terminal on AND gate 141 is connected to the output terminal of the block representing group carry enable signal $G_2$. A second input terminal on AND gate 141 is connected to a terminal 140 adapted to receive control signal $T_2$. Thus the only signal which can appear at the output terminal of AND gate 141 is comprised of $T_2$ and $G_2$. This signal will pass through inverter 142, negative OR gate 143, and inverter 144 to appear at the input terminal of AND gate 137. Thus one of the only signals which can appear at the output terminal of gate 137 is comprised of $A_1$ and $T_2$ and $G_2$, which will be recognized as one of the signals which can set the OV bistable element. The signal will then pass through an inverter 138, and negative OR gate 135 to the "S" input terminal of the OV bistable element.

A second input terminal on negative OR gate 143 is connected to an output terminal on a negative AND gate 147. A first input terminal of gate 147 is connected to the "0" output terminal of bistable element $A_2$. A second input terminal on gate 147 is connected to the "0" output terminal of bisable element $A_3$. A third input terminal on gate 147 is connected to an output terminal on an inverter 146 which has its input terminal connected to the output terminal of an AND gate 145. A first input terminal of AND gate 145 is connected to terminal 140. A second input terminal of AND gate 145 is connected to the output terminal of a block representing group carry enable signal $G_4$. Thus the only signal which can appear at the output terminal of AND gate 145 is comprised of $T_2$ and $G_4$. This signal will be felt through inverter 146 on the input terminal of negative AND gate 147. Thus the only signal which can appear at the output terminal of gate 147 is comprised of $T_2$ and $G_4$ and $A_2$ and $A_3$. This signal will then pass through negative OR gate 143, and inverter 144 to be felt on the input terminal of AND gate 137. Thus the only other signal which can pass through AND gate 137 is comprised of $A_1$ and $A_2$ and $A_3$ and $T_2$ and $G_4$, which will be recognized as one of the signals which can set the OV bistable element. This signal will then pass through inverter 138 and negative OR gate 135 to the "S" input terminal of the OV bistable element.

For purposes of clarity, control pulse $T_1$ has been shown in each of FIGS. 2–6 as entering a different inverter, respectively indicated, 12, 26, 42, 62 and 81. In the preferred embodiment it is intended that these all actually be one single inverter.

Figure 10:
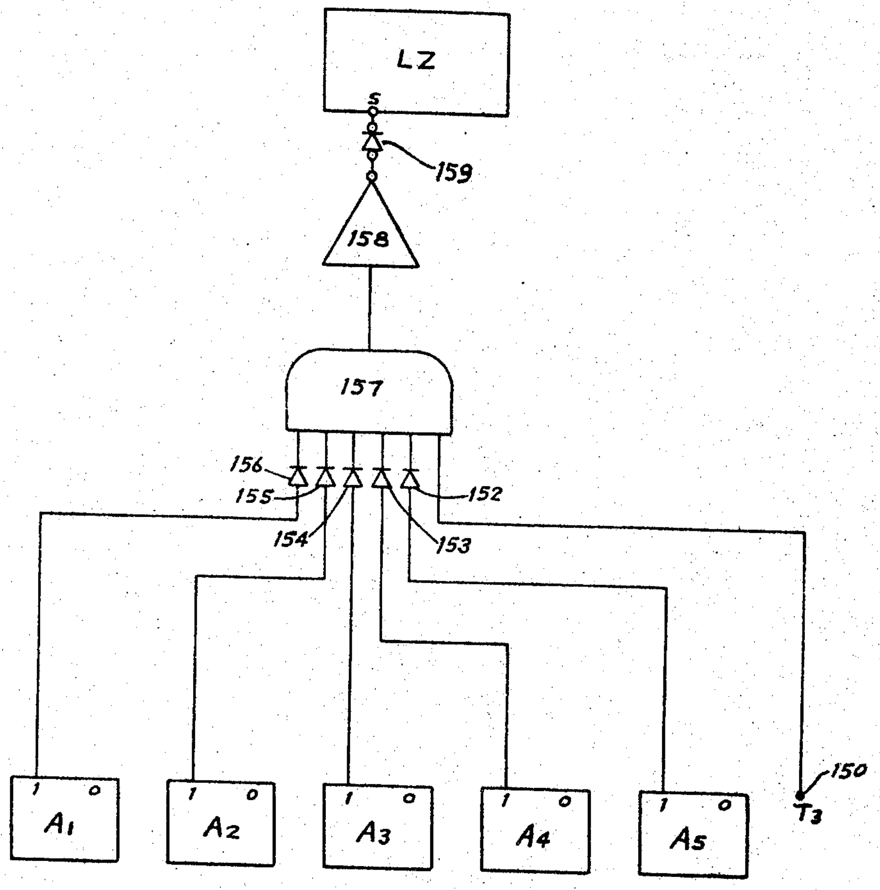
FIG. 10 is a logic diagram showing the network used to provide a signal to set a logic zero bistable element also used in completing the algorithm used with the network of this invention.

Referring now to FIG. 10 it is apparent that this logical schematic is an implementation of Boolean Equation No. 7. This network will provide a signal to set a logic zero flip-flop LZ in the presence of a signal comprised of $A_1$ and $A_2$ and $A_3$ and $A_4$ and $A_5$ and $T_3$.

In FIG. 10 there is shown an AND gate 157 having six input terminals and an output terminal. A first input terminal on gate 157 is connected to a terminal 150 adapted to receive a control pulse $T_3$. A second input terminal on gate 157 is connected through a diode 152 to the "1" output terminal of bistable element $A_5$. A third input terminal on gate 157 is connected through a diode 153 to the "1" output terminal of bistable element $A_4$. A third input terminal on gate 157 is connected through a diode 153 to the "1" output terminal of bistable element $A_4$. A fourth input terminal on gate 157 is connected through a diode 154 to the "1" output terminal of bistable element $A_3$. A fifth input terminal on gate 157 is connected through a diode 155 to the "1" output terminal of bistable element $A_2$. A sixth input terminal on gate 157 is connected through a diode 156 to the "1" output terminal of bistable element $A_1$. Thus the only signal which can appear at the output terminal of AND gate 157 is comprised of $T_3$ and $A_5$ and $A_4$ and $A_3$ and $A_2$ and $A_1$, which will be recognized as the signal required to set the logic zero or LZ bistable element. This signal will then pass through an inverter 158 and through an isolation diode 159 to the "S" or set input terminal on the LZ bistable element.

Figure 11:
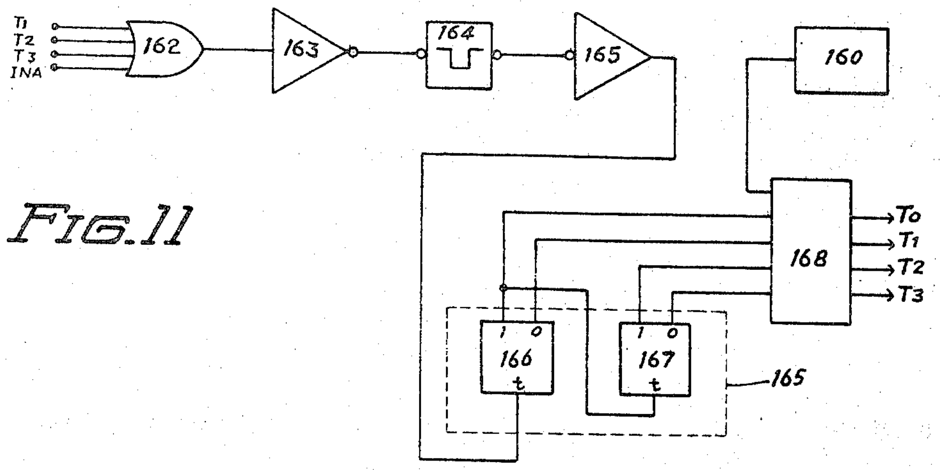
FIG. 11 is a logic diagram of the counting network and associated clock pulses used to provide timed sequence pulses for operation of the network of this invention.
Figure 12:
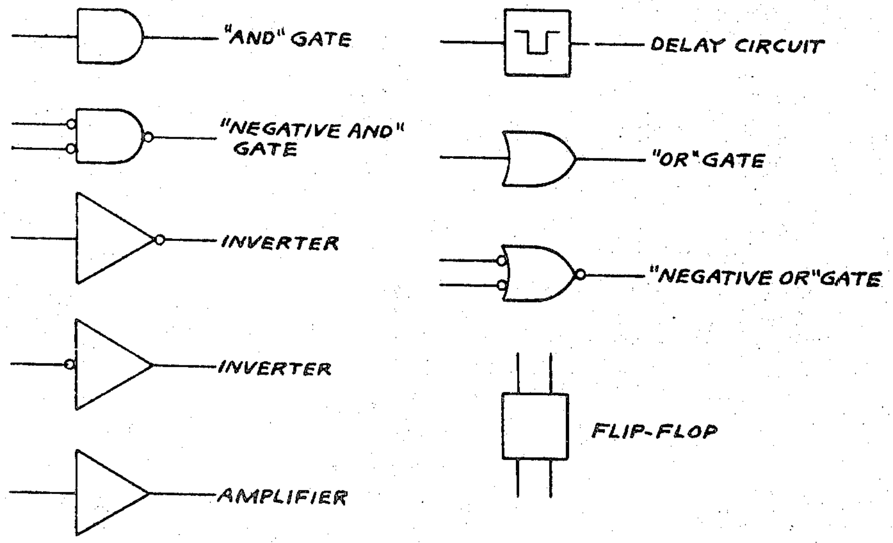
FIG. 12 is a chart indicating the meaning of the logic symbols used in the drawings.

Referring now to FIG. 11 there is shown an example of the manner in which the control signals or pulses $T_1$, $T_2$ and $T_3$ can be derived. A clock 160 which provides clock pulses is connected to an input terminal for a plurality of logic elements represented by block 168, which provides four output signals $T_0$, $T_1$, $T_2$ and $T_3$. There is also shown an adder control counter 165, comprised of a pair of bistable elements 166 and 167 interconnected to provide a four digit count output. The "0" and "1" output terminals of bistable elements 166 and 167 are also connected to the plurality of logic elements represented by block 168. When counter 165 is in its zero condition, that is when both elements 166 and 167 are in the reset condition, the output enabled from block 168 will be that of $T_0$. Therefore, each time a clock pulse from clock 160 enters block 168 it will be felt on output line $T_0$ only.

There is also shown an OR gate 162 which has an output terminal connected to an inverter 163, the output of which is in turn connected through a delay circuit 164 to another inverter 165. The output of inverter 165 is connected to the toggle input of bistable element 166 in adder control counter 165. Outputs $T_1$, $T_2$ and $T_3$ are each connected to an input terminal on OR gate 162. An initiate add input, INA, is also connected to an input terminal on OR gate 162.

Assuming now that adder control counter 165 is in its zero condition, all clock pulses from clock 160 will initiate a signal on line $T_0$ only, and there will be no signals on lines $T_1$, $T_2$ and $T_3$. Therefore, there will be no input to OR gate 162 unless an initiate add pulse is present. Assume now that an initiate add pulse is presented to the input of OR gate 162. The pulse will be felt through inverter 163, delay circuit 164, and inverter 165 to toggle bistable element 166 in counter 165. As a result, the next clock pulse from clock 160 will be felt on output $T_1$ from block 168 rather than output $T_0$. As described above, output $T_1$ will then be present to initiate the logical sequences described for FIGURES 2–10. In addition, pulse $T_1$ will also be present at the input to OR gate 162, to pass through the various logic elements 163, 164 and 165 to toggle element 166. Element 166 will now reset, but because the "1" output terminal of element 166 is connected to the toggle input of element 167, element 167 will be set and provide another signal to block 168. Now the next clock pulse from clock 160 will be felt on output $T_2$, and the sequence will be as described above for $T_1$, that is $T_2$ will, in addition to initiating its logical functions, be felt through OR gate 162 and the various logic elements to again toggle counter 165. This will cause $T_3$ to occur at the next clock pulse, and when $T_3$ has passed through the various logic elements to toggle counter 165, the counter will be set to its zero position again and the add sequence will be completed. Once again all outputs from block 168 will appear on output $T_0$, until an initiate add pulse is presented to the input of OR gate 162.

It will now be apparent that the logic networks as described above comprise an interconnected superstructure of the logic which in turn interconnects a pair of binary storage registers to perform addition of the numbers stored in the two registers. This parallel adder network is unique in requiring a minimum of hardware for parallel addition of binary numbers, and in not requiring an interim register. Though the results of the network of this invention are accomplished as the cost of speed, the savings in hardware and the ease of understanding and layout of the operation and components of this network are quite useful in many operations, for example, in an educational computer. Further though the network of this invention results in the use of a minimum amount of hardware, the algorithm used to perform the addition is sophisticated and is exemplary of algorithm of this general type and is therefore useful in conjunction with items such as an educational computer.

It will be apparent that the particular logic components used in the embodiment described above may be varied without departing from the spirit of the invention. For example, AND gates may be substituted for negative AND gates with corresponding changes in the associated inverters and amplifiers. Also, the various series of logic networks can be varied to accomplish the particular alogrithm selected, without departing from the scope of this invention. Though the operation of the network of this invention has been described as related to three time phases, the same results could be accomplished in two time phases with slight modifications in hardware which would not affect the scope of this invention.

The embodiments of the invention in which an exclusive property or privilege is claimed are defined as follows:

1. A binary adder circuit comprising:
first and second binary registers for storing binary information to be added;
means for producing a plurality of control pulses in timed sequence;
logic circuit means connected to said first and second registers, and said means for producing control pulses for operating during one of said control pulses to transfer information from said first register for addition to information in said second register; and
further logic circuit means connected to said first and second registers, and said means for producing control pulses for operating during another of said control pulses to generate carry pulses into said second register dependent on the information stored in said first and second registers following said one control pulse.

2. The binary adder circuit of claim 1 including:
a bistable circuit; and
still further logic circuit means connected to said bistable circuit and said second register, and said means for producing control pulses for operating during a further of said control pulses to generate a set pulse to set said bistable circuit dependent on the presence of predetermined binary information in said second register following said another control pulse.

3. The binary adder circuit of claim 1 including:
an overflow bistable circuit; and
overflow logic circuit means connected to said overflow bistable circuit, said first and second registers, and said further logic circuit, means, for operating during said one and said another control pulses, respectively, for generating a carry pulse to set said overflow bistable circuit dependent on the information stored in said first and second registers following, respectively, said one and another control pulses.

4. A parallel binary adder network comprising:
a first binary storage register including a first plurality of interconnected bistable circuit elements;
a second binary storage register including a second plurality of interconnected bistable circuit elements;
logic circuit means connecting each of said first plurality of bistable elements to at least one of said second plurality of bistable elements, for transferring information stored in said first register to be added to information stored in said second register;
a counter means for generating a timed series of control pulses;
means connecting said counter means to said logic circuit means;
a first portion of said logic circuit means for operating during a first of said control pulses to selectively transfer information from each of said bistable elements in said first register to a corresponding bistable element in said second register; and
a second portion of said logic circuit means for operating during a second of said control pulses to selectively transfer further information comprising carries to said bistable elements in said second register, and including means for controlling the selective transfer of further information during said second control pulse by the information stored in said first and second plurality of bistable elements following said first control pulse.

5. The parallel binary adder network of claim 4 including:
an overflow bistable circuit element interconnected with at least one of said second plurality of bistable circuit elements and a third portion of said logic circuit means; and
said third portion of said logic circuit means for operating during said first and second control pulses to selectively transfer information to said overflow bistable element, the transfer of information to said overflow bistable element during said first and second control pulses being controlled, respectively, by the information stored in said first and second plurality of bistable elements prior to and following said first control pulse.

6. The parallel binary adder network of claim 4 including:

a further bistable circuit element;

further logic circuit means connecting each of said second plurality of bistable circuit elements to said further bistable element, for transferring information from said second binary storage register, to said further bistable element;

means connecting said counter means to said further logic circuit means; and said further logic circuit means [operative] for operating during a third of said control pulses to transfer information to said further bistable element dependent on the presence of predetermined information in said second binary storage register following said second control pulse.

7. A parallel binary adder comprising:

first and second binary storage registers, each including a plurality of flip-flops capable of assuming a true state or a false state;

means including logic gates connecting each flip-flop in said first register to a respective flip-flop in said second register;

means for providing a series of control pulses and including a first control pulse output terminal and a second control pulse output terminal;

means connecting said first control pulse output terminal to a first portion of said logic gates for enabling transfer of information from said first register to said second register during a first of said control pulses;

means connecting said second control pulse output terminal to a second portion of said logic gate for enabling generation of carry information during a second of said control pulses;

an overflow flip-flop;

means including a third portion of said logic gates connecting said overflow flip-flop to said first and second registers; and means connecting said first and second control pulse output terminals to said third portion of said logic gates for enabling setting of said overflow flip-flop to the true state during said first and said second control pulses.

8. The parallel binary adder of claim 7 including:

a logic zero flip-flop;

means including a further logic gate connecting said logic zero flip-flop to each flip-flop in said second register;

a third control pulse output terminal on said means for providing a series of control pulses; and means connecting said third control pulse output terminal to said further logic gate to enable setting of said logic zero flip-flop to the true state during a third of said control pulses, when all flip-flops in said second register are in the true state following said second control pulse.

9. In a binary arithmetic network for combining binary numbers stored in first and second storage registers each including an equal plurality of bistable elements, the improvment comprising:

first logic circuit means connecting each bistable element representing a particular bit significance of the binary number in the first register to a corresponding bistable element representing the same bit significance of the binary number in the second register;

second logic circuit means interconnecting the first logic circuit means, the bistable elements of the first register, and the bistable elements of the second register;

control means for providing control pulses and connected to the first and second logic circuit means;

the first logic circuit means adapted to be enabled during a first control pulse from the control means for transferring binary information from the first to the second storage register according to a predetermined algorithm; and the second logic circuit means adapted to be enabled during a second control pulse from the control means for inserting binary information into the second register to complete combination of the binary numbers originally stored in the first and second registers according to the algorithm.

10. The improved binary arithmetic network of claim 9 including:

an overflow bistable element;

further logic circuit means connecting the overflow bistable element to the first and second registers and to the control means for setting the overflow bistable element according to the algorithm during the first and second control pulses.

11. The improved binary arithmetic network of claim 9 including:

a logic zero bistable element;

further logic circuit means connecting the bistable elements of the second register to the logic zero bistable element and to the control means for setting the logic zero bistable element according to the algorithm during a third control pulse.

12. A parallel binary arithmetic network comprising:

first and second binary storage registers interconnected by a logic circuit superstructure;

means connected to said logic circuit superstructure for providing a first control signal to a first portion of said logic circuit superstructure to add a binary number stored in said first register to a binary number stored in said second register without regard to carries; and further means connected to said logic circuit superstructure for providing a second control signal to a second portion of said logic circuit superstructure to generate carries into said second register to complete the addition of the binary numbers and including means for controlling the generation of carries determined by the binary numbers in said first and second registers following the first control pulse, said second portion of said logic superstructure interconnecting predetermined groups of bistable elements within said first and second registers to propagate carries between said groups in said second register.

References Cited

UNITED STATES PATENTS

| | | | |
|---|---|---|---|
| 3,290,494 | 12/1966 | Schneberger et al. | 235—175 |
| 3,320,410 | 5/1967 | Barrett et al. | 235—175 |
| 3,388,239 | 6/1968 | Duncan et al. | 235—175 |
| 3,229,079 | 1/1966 | Zink | 235—164 |

MALCOLM A. MORRISON, Primary Examiner

D. A. MALZAHN, Assistant Examiner

U.S. Cl. X.R.

235—173